(12) United States Patent
Hayase

(10) Patent No.: US 6,268,575 B1
(45) Date of Patent: Jul. 31, 2001

(54) LEVER SWITCH DEVICE

(75) Inventor: Fumitaka Hayase, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/432,571

(22) Filed: Nov. 12, 1999

(30) Foreign Application Priority Data

Nov. 19, 1998 (JP) .................................................. 10-329351

(51) Int. Cl.[7] .................................................. H01H 3/16
(52) U.S. Cl. ........................................ 200/61.27; 200/561
(58) Field of Search ............................. 200/61.54, 61.27, 200/437, 438, 566, 339, 561, 335

(56) References Cited

U.S. PATENT DOCUMENTS

| | | | |
|---|---|---|---|
| 3,167,622 | * | 1/1965 | Locker .................................... 200/68 |
| 4,920,239 | * | 4/1990 | Bühler et al. ...................... 200/61.54 |
| 5,196,662 | * | 3/1993 | Hofmann .......................... 200/61.54 |
| 5,739,751 | * | 4/1998 | Ishihara et al. ....................... 340/475 |
| 5,831,231 | * | 11/1998 | Uchiyama ......................... 200/61.54 |
| 5,861,594 | * | 1/1999 | Akimoto et al. ................... 200/61.54 |
| 5,900,601 | * | 5/1999 | Uchiyama .......................... 200/61.27 |
| 6,006,624 | * | 12/1999 | Uchiyama .............................. 74/489 |

* cited by examiner

Primary Examiner—Paula Bradley
Assistant Examiner—Nhung Nguyen
(74) Attorney, Agent, or Firm—Morgan, Lewis & Bockius LLP

(57) ABSTRACT

The present invention is for enlarging the moving stroke of a movable member according to rotation of a lever. Operation projecting portions for moving a contact holder are provided in a moderation piece provided in the base end portion of the lever, movably in the axial direction. When the lever is rotated in the arrow A direction, the moderation piece moves in the arrow B direction while sliding a cam surface. According thereto, the operation projecting portions press the inclined surface of guiding portions so as to move the contact holder in the arrow C direction. At the time, since the moving amount of the moderation piece in the axial direction can be added to the moving stroke L2 of the contact holder, the moving stroke L2 of the contact holder can be enlarged compared with the case with the operation projecting portions provided in the lever.

3 Claims, 6 Drawing Sheets

LEVER SWITCH DEVICE

BACKGROUND OF THE INVENTION

1. Field of Invention

The present invention relates to a lever switch device for operating a switch according to movement of a movable member based on a rotation operation of a lever.

2. Related Art

An example of conventional embodiments is shown in FIGS. 4 to 6. In FIG. 4, a lever 1 is supported by a turning bracket 2 rotatably around an axis 3 in the arrow A direction and the opposite arrow A direction as well as it is mounted between a case 4 and a cover 5 rotatably around an axis portion 2a of the bracket 2 in the direction orthogonal to the arrow A direction (front and rear side direction with respect to the paper surface). A piece accommodating portion 1b is formed at the base end portion 1a of the lever 1, elongating in the axial direction such that a moderation piece 6b forced outward in the axial direction by a spring 6a is inserted in the piece accommodating portion 1b slidably in the arrow B direction and the opposite arrow B direction, that is, in the axial direction. As shown in FIG. 6, operation projecting portions 1c, projecting sideways, are formed at both side portions of the base end portion 1a of the lever 1.

A moderating cam surface 7 is formed in the bracket 2 at a portion facing with the base end portion 1a of the lever 1 such that the tip of the moderation piece 6b is contacted with the cam surface 7 slidably. In the case 4, a contact holder 8 is provided in the upper part of FIG. 4 as a movable member. The contact holder 8 is provided slidably in the arrow C direction and the opposite arrow C direction, that is, in the substantially the same direction as the moving direction of the moderation piece 6b, and in the direction orthogonal thereto (front and rear side direction with respect to the paper surface).

As shown in FIG. 6, the contact holder 8 is provided with two arm portions 8a, with the base end portion 1a of the lever 1 interposed therebetween. Guiding portions 8b comprising inclined grooves are formed on the inner surface side of the arm portions 8a. The operation projecting portions 1c are inserted in the guiding portions 8b slidably. A movable contact point 9 is provided on the upper part of the contact holder 8 in FIG. 4. The case 4 is provided with an insulator 10 so as to cover the contact holder 8, with a fixed contact point 11 provided on the lower surface of the insulator 10. The movable contact point 9 and the fixed contact point 11 includes a switch 12.

In the above configuration, when the lever 1 at the solid line position of FIG. 4 is rotated in the arrow A direction, the tip of the moderation piece 6b slides the cam surface 7 upward and the moderation piece 6b moves in the arrow B direction as well as the operation projecting portions 1c rotate integrally with the lever 1. According to the rotation of the operation projecting portions 1c, the operation projecting portions 1c press the inclined surface of the guiding portions 8b so as to move the contact holder 8 in the arrow C direction (see the chain double-dashed line in FIG. 4 and FIG. 5). Accordingly, the device is switched to the state wherein the movable contact point 9 contacts with the passing fixed contact point 11 so that the passing switch 12 is turned on.

When the rotational force on the lever 1 in the arrow A direction is released in the state of FIG. 5, the tip of the moderation piece 6b slides on the cam surface 7 downward and the moderation piece 6b moves in the direction opposite to the arrow B direction as well as the lever 1 is rotated in the direction opposite to the arrow A direction. At the time, since the operation projecting portions 1c press the inclined surface of the guiding portions 8b according to the rotation of the operation projecting portions 1c, the contact holder 8 is moved in the direction opposite to the arrow C direction (see the solid line position of FIG. 4). Accordingly, the movable contact point 9 is moved away from the passing fixed contact point 11 so that the passing switch 12 is turned off.

In the conventional configuration, since the contact holder 8 is moved by the operation projecting portions 1c provided in the lever 1 via the guiding portions 8b, the moving stroke L1 of the contact holder 8 (see FIG. 4) is determined by the rotation angle of the lever 1, the position of the operation projecting portions 1c with respect to the lever 1, and the inclination angle of the guiding portions 8b. Therefore, in the case the rotation angle of the lever 1, the position of the operation projecting portions 1c, and the inclination angle of the guiding portions 8b are the same, the moving stroke L1 of the contact holder cannot be made larger.

SUMMARY OF THE INVENTION

In order to cope with the above-mentioned circumstances, an object of the invention is to provide a lever switch device capable of enlarging the moving stroke of a movable member according to rotation of a lever.

In order to achieve the object, the invention comprises a lever provided reciprocally rotatably around an axis, a moderation piece provided at the base end portion of the lever reciprocally movably in the axial direction of the lever, forced outward in the axial direction by a spring, a cam surface provided so as to contact with the tip of the moderation piece slidably according to rotation of the lever for moving the moderation piece in the axial direction according to the slide of the moderation piece, operation projecting portions provided in the moderation piece, projecting in the direction orthogonal to the moving direction of the moderation piece and the rotation direction of the base end portion of the lever for moving integrally with the moderation piece, a movable member provided reciprocally movably in the direction substantially the same as the moving direction of the moderation piece, guiding portions provided in the movable member, tilted with respect to the moving direction of the movable member for inserting the operation projecting portions slidably therein so as to move the movable member according to the slide of the operation projecting portions based on the rotation of the lever, and a switch for switching the state according to the movement of the movable member.

According to the invention, since the operation projecting portions for moving the movable member are provided in the moderation piece for moving along the cam surface according to the rotation of the lever, the moving amount of the moderation piece can be added to the moving stroke of the movable member. Therefore, compared with the case with the operation projecting portions provided at the base end portion of the lever, the moving stroke of the movable member can be enlarged.

DESCRIPTION OF THE PREFERRED EMBODIMENT

Hereinafter, an embodiment of the invention will be described with reference to FIGS. 1 to 3.

Figure 1:
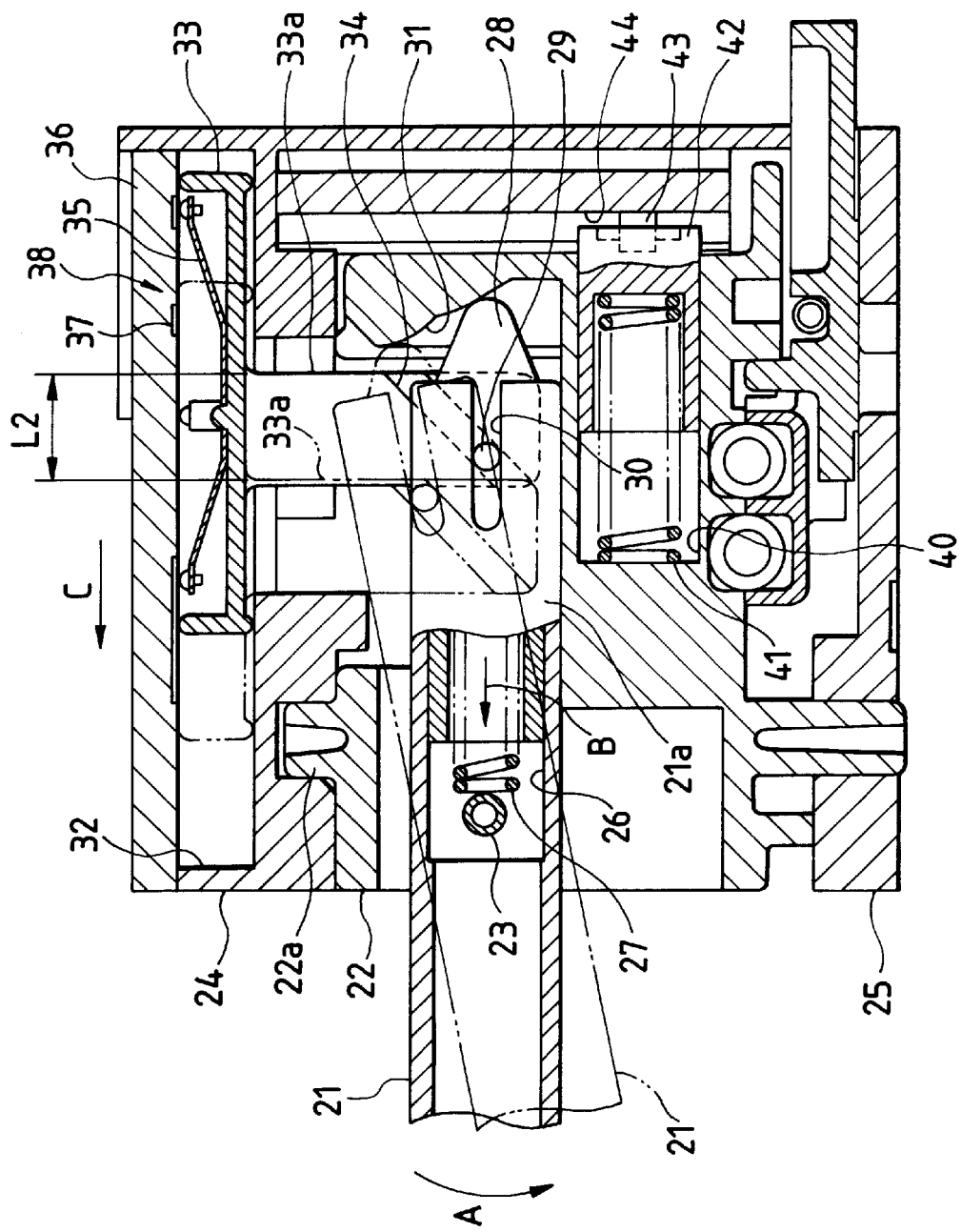
FIG. 1 is a cross-sectional view showing an embodiment of the invention.

In FIG. 1, a lever 21 is supported by a turning bracket 22 rotatably around an axis 23 in the arrow A direction and the opposite arrow A direction as well as it is mounted between a case 24 and a cover 25 rotatably around an axis portion 22a of the bracket 22 in the direction orthogonal to the arrow A direction (front and rear side direction with respect to the paper surface). A piece accommodating portion 26 is formed at the base end portion 21a of the lever 21, elongating in the axial direction such that a passing moderation piece 28 forced outward in the axial direction by a spring 27 comprising a compression spring is inserted in the piece accommodating portion 26 slidably in the arrow B direction and the opposite arrow B direction, that is, in the axial direction.

Figure 3:
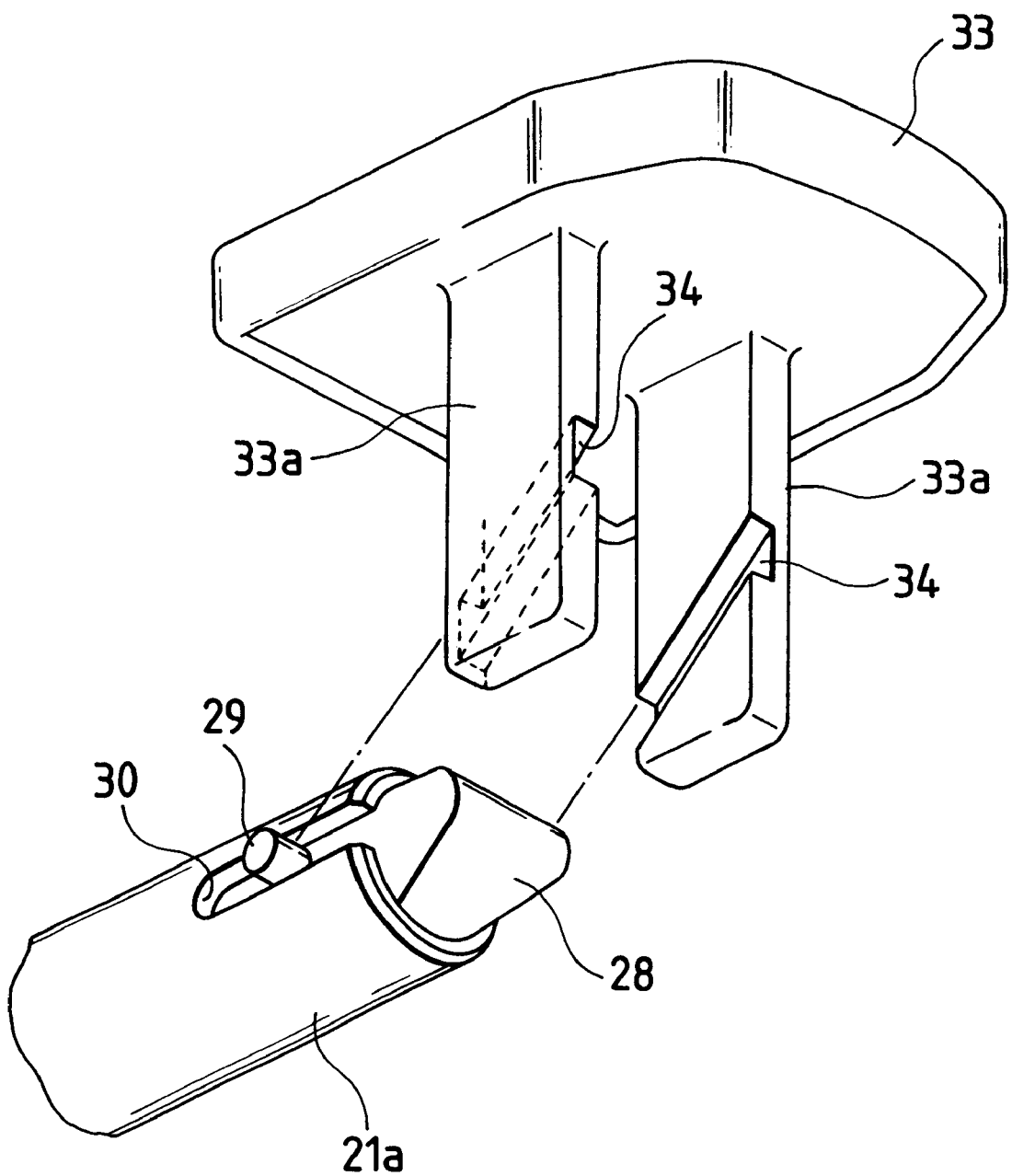
FIG. 3 is an exploded perspective view of the essential part.
Figure 4:
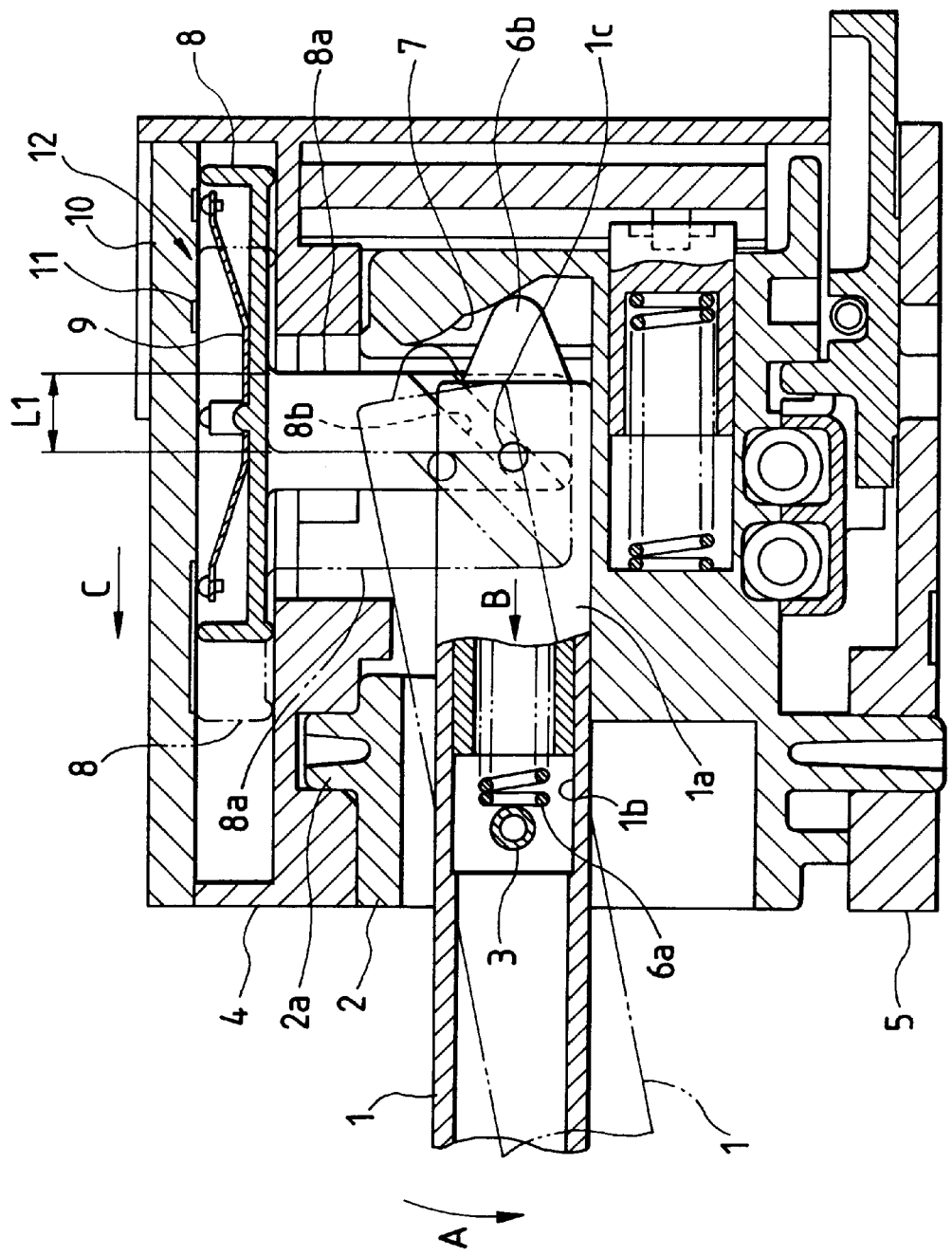
FIG. 4 is a cross-sectional view showing a conventional configuration, corresponding to FIG. 1.
Figure 5:
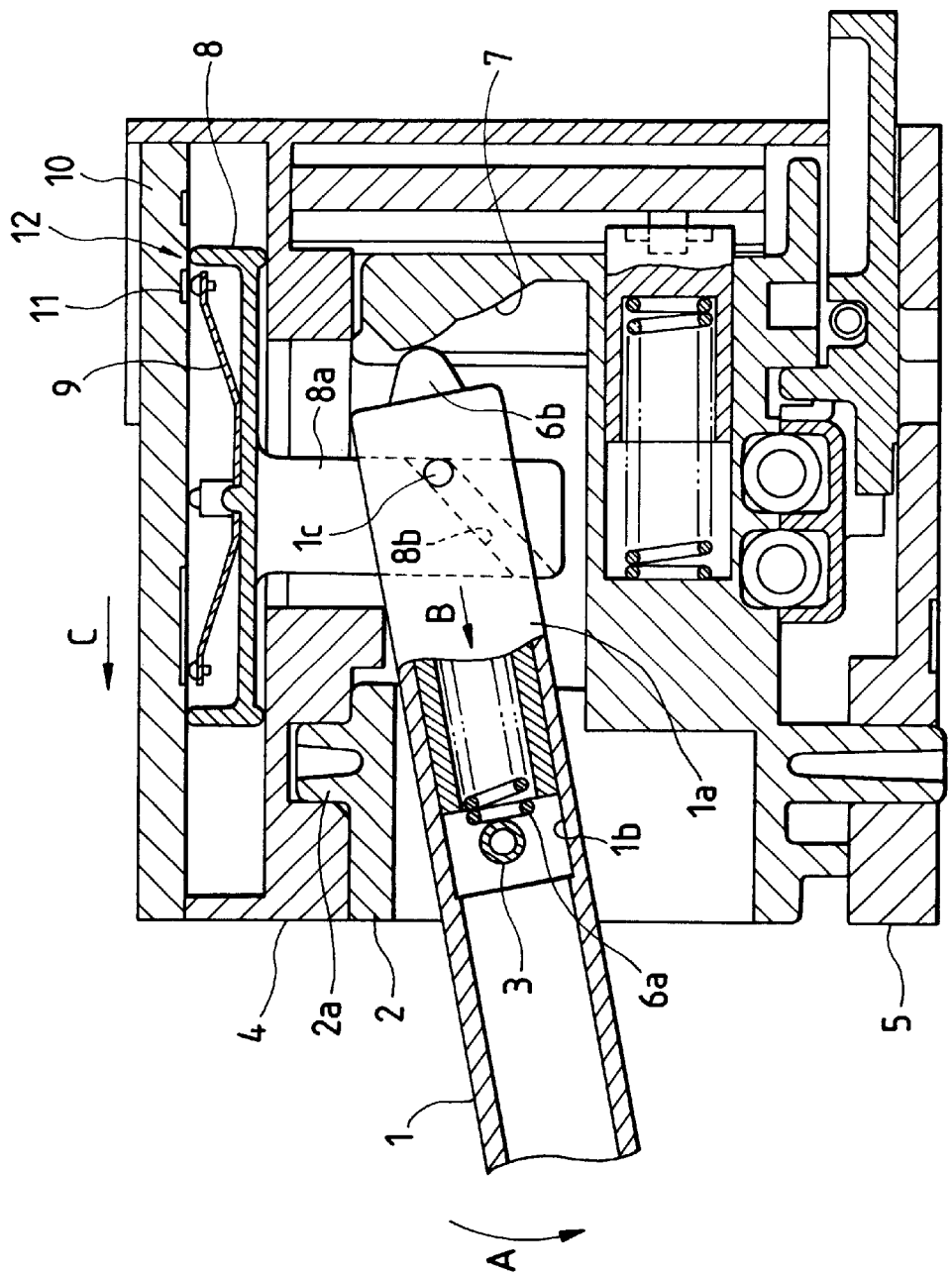
FIG. 5 is a cross-sectional view of the conventional configuration, corresponding to FIG. 2.
Figure 6:
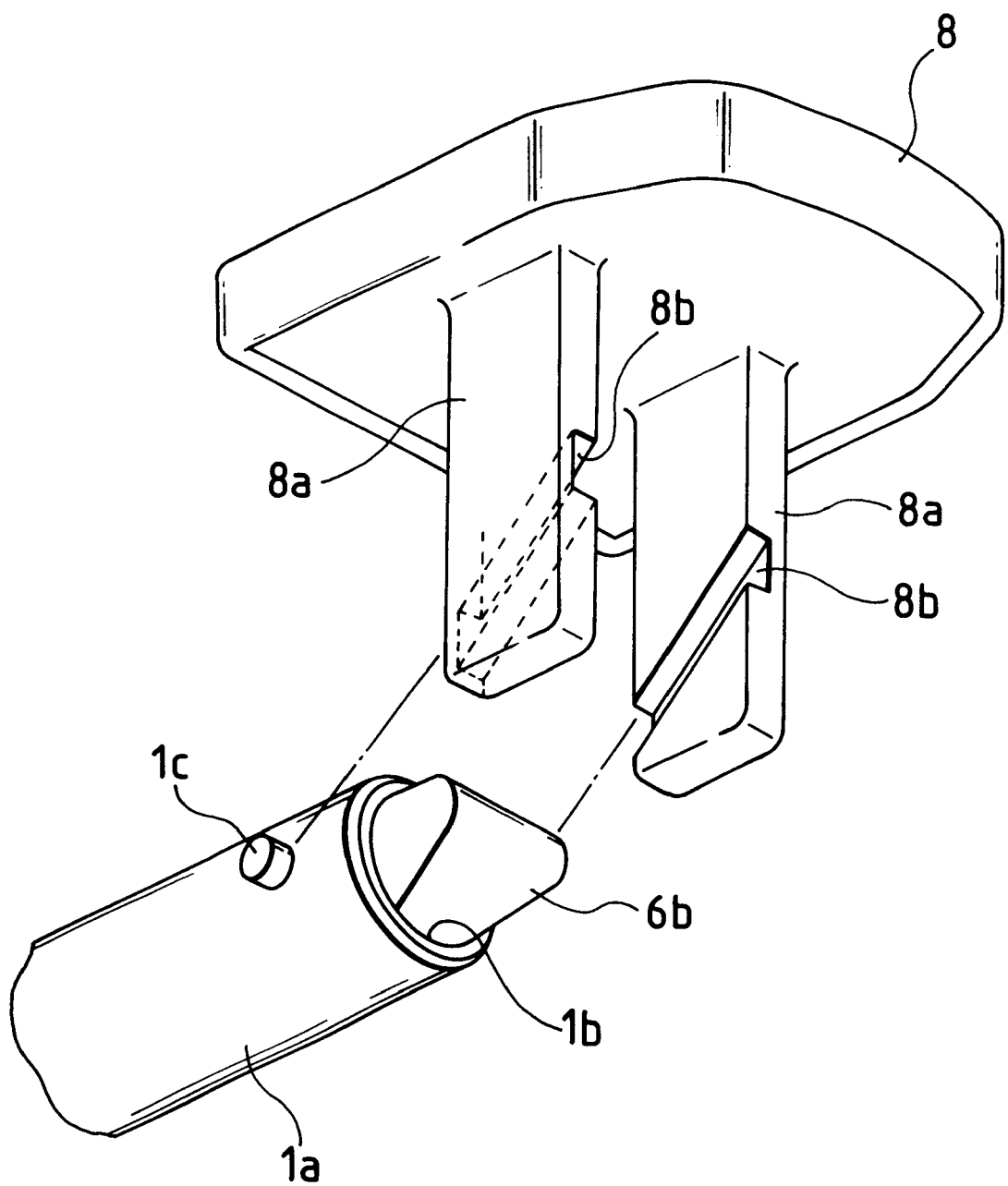
FIG. 6 is an exploded perspective view of the conventional configuration, corresponding to FIG. 3.

As shown in FIG. 3, operation projecting portions 29, projecting sideways, are formed at both side portions of the moderation piece 28 (only one of them is shown in FIG. 3). The operation projecting portions 29 are projected in the direction orthogonal to the axial direction, which is the moving direction of the moderation piece 28 (the arrow B direction and the opposite arrow B direction) and the rotational direction of the base end portion 21a of the lever 21 (the arrow A direction and the opposite arrow A direction). Holes 30 for guiding the movement of the operation projecting portions 29 are formed at the base end portion 21a of the lever 21, elongating in the axial direction.

A passing cam surface 31 is formed in the bracket 22 at a portion facing with the base end portion 21a of the lever 21 such that the tip of the moderation piece 28 is contacted with the cam surface 31 slidably. The upper part of the cam surface 31 projects to the lever 21 side (left side) with respect to the lower part in FIG. 1. In the case 24, an accommodating portion 32 is formed in the upper part of FIG. 1, with a contact holder 33 comprising a movable member provided in the accommodating portion 32. The contact holder 33 is provided slidably in the arrow C direction and the opposite arrow C direction, that is, in the substantially the same direction as the moving direction of the moderation piece 28, and in the direction orthogonal thereto (front and rear side direction with respect to the paper surface).

As shown in FIG. 3, the contact holder 33 is provided with two arm portions 33a, with the base end portion 21a of the lever 21 interposed therebetween. Guiding portions 34 comprising inclined grooves inclined with respect to the moving direction of the contact holder 33 (the arrow C direction and the opposite arrow C direction) are formed on the inner surface side of the arm portions 33a. The operation projecting portions 29 are inserted in the guiding portions 34 slidably.

A movable contact point 35 is provided on the upper part of the contact holder 33 in FIG. 1. The case 24 is provided with an insulator 36 so as to cover the contact holder 33, with a fixed contact point 37 to be contacted with or separated from the movable contact point 35 provided on the lower surface of the insulator 36. The movable contact point 35 and the fixed contact point 37 comprise a switch 38.

In FIG. 1, an accommodating portion 40 is formed in the bracket 22 below the lever 21, with a turning moderation piece 42 forced outward in the axial direction by a spring 41 comprising a compression spring inserted slidably in the accommodating portion 40. A roller 43 is provided rotatably at the tip portion of the moderation piece 42. A turning moderation portion 44 is provided at a portion facing with the tip portion of the moderation piece 42, with the roller 43 contacting with the moderation portion 44 rotatably.

In the above configuration, when the lever 21 at the solid line position of FIG. 1 is rotated in the arrow A direction, the tip of the moderation piece 28 slides the cam surface 31 upward and the moderation piece 28 moves in the arrow B direction. According to the rotation and movement of the moderation piece 28, the operation projecting portions 29 provided in the moderation piece 28 press the inclined surface of the guiding portions 34 so as to move the contact holder 33 in the arrow C direction (see the chain double-dashed line in FIG. 1 and FIG. 2). Accordingly, the device is switched to the state wherein the movable contact point 35 contacts with the passing fixed contact point 37 so that the passing switch 38 is turned on.

Figure 2:
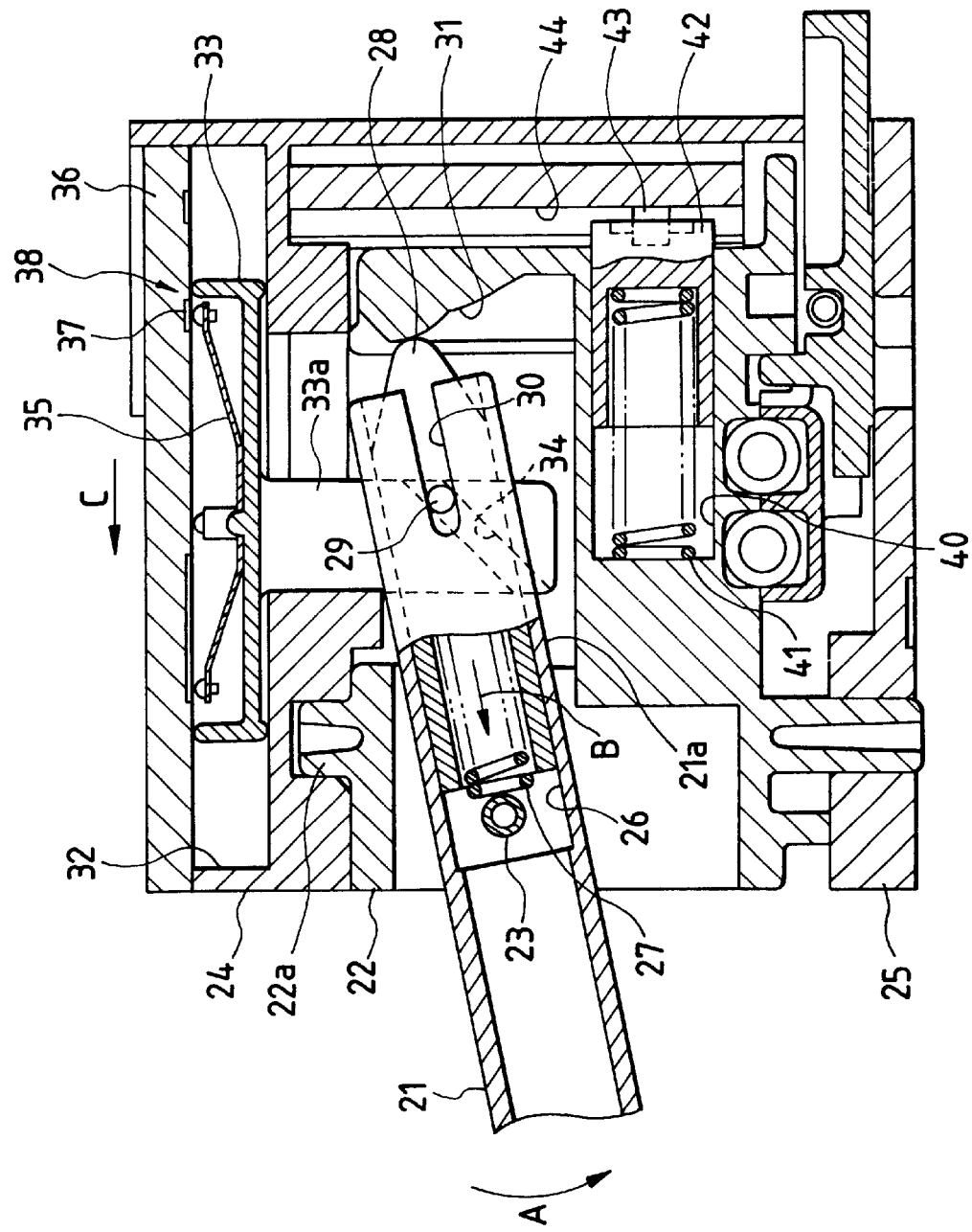
FIG. 2 is a cross-sectional view showing the state with a lever rotated.

When the rotational force on the lever 21 in the arrow A direction is released in the state of FIG. 2, the tip of the moderation piece 28 slides on the cam surface 31 downward and the moderation piece 28 moves in the direction opposite to the arrow B direction as well as the lever 21 is rotated in the direction opposite to the arrow A direction. At the time, since the operation projecting portions 29 press the inclined surface of the guiding portions 34 according to the rotation and movement of the moderation piece 28, the contact holder 33 is moved in the direction opposite to the arrow C direction (see the solid line position of FIG. 1). Accordingly, the movable contact point 35 is moved away from the passing fixed contact point 37 so that the passing switch 38 is turned off.

On the other hand, when the lever 21 is rotated in the direction orthogonal to the arrow A direction (front and rear side direction with respect to the paper surface), the lever 21 is rotated with the bracket 22 around the axis portion 22a of the bracket 22. Then, the roller 43 of the turning moderation piece 42 rotates the moderation portion 44 as well as the base end portion 21a of the lever 21 presses the arm portions 33a of the contact holder 33 in the direction orthogonal to the arrow A direction so as to move the contact holder 33 in the same direction. Accordingly, the movable contact point 35 is contacted with the left or right fixed contact point (not illustrated) so that the turn switch is switched on.

According to the embodiment, since the operation projecting portions 29 for moving the contact holder 33 are provided in the moderation piece 28 for moving along the cam surface 31 according to the rotation of the lever 21, the moving amount of the moderation piece 28 in the axial direction (the arrow B direction) can be added to the moving stroke L2 of the contact holder 33 (see FIG. 1). Therefore, the moving stroke L2 of the contact holder 33 can be enlarged compared with the moving stroke L1 of the conventional contact holder 8 (L2>L1).

The invention is not limited to the embodiment, but can be modified or expanded as follows.

Although the embodiment has a configuration comprising the contact holder 33 having the movable contact point 35 as the movable member so that the state of the switch 38 is switched according to the movement of the movable contact 35 movable with the contact holder 33, the movable member may comprise a tact switch to be operated independently according to the movement thereof.

The operation projecting portions 29 may be displaced from the axial center line in the rotational direction in stead of being positioned on the axial center line of the base end portion 21a of the lever 21.

As apparent from the description so far, according to the invention, since the operation projecting portions for moving the movable member are provided in the moderation piece to be moved along the cam surface according to the rotation of the lever, the moving amount of the moderation piece can be added to the moving stroke of the movable member. Therefore, compared with the case with the operation projecting portions provided at the base end portion of the lever, the moving stroke of the movable member can be enlarged.

What is claimed is:

1. A lever switch device comprising:

a lever provided reciprocally rotatably around an axis;

a moderation piece provided at the base end portion of the lever reciprocally movably in the axial direction of the lever, forced outward in the axial direction by a spring;

a cam surface provided so as to contact with the tip of the moderation piece slidably according to rotation of the lever for moving the moderation piece in the axial direction according to the slide of the moderation piece;

operation projecting portions provided in the moderation piece, projecting in the direction orthogonal to the moving direction of the moderation piece and the rotation direction of the base end portion of the lever for moving integrally with the moderation piece;

a movable member provided reciprocally movably in the direction substantially the same as the moving direction of the moderation piece;

guiding portions provided in the movable member, tilted with respect to the moving direction of the movable member for inserting the operation projecting portions therein so as to move the movable member according to the movement of the operation projecting portions based on the rotation of the lever; and a switch for switching the state according to the movement of the movable member.

2. A lever switch device as claimed in claim 1, wherein the operation projecting portions moves slidably with respect to the axis of the lever.

3. A lever switch device as claimed in claim 1, wherein the operation projecting portions moves rotatably with respect to the axis of the lever.

* * * * *